(12) United States Patent
Bremmer et al.

(10) Patent No.: US 10,696,413 B2
(45) Date of Patent: Jun. 30, 2020

(54) BLADE HEATER MAT INSULATION

(71) Applicant: SIKORSKY AIRCRAFT CORPORATION, Stratford, CT (US)

(72) Inventors: Jonathan Bremmer, Glastonbury, CT (US); Robert A. Lacko, Oxford, CT (US); Joseph B. Ozelski, Shelton, CT (US); David P. Baranowski, Madison, CT (US); Jeffrey G. Sauer, Woodbury, CT (US); Frank Caputo, Cheshire, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 426 days.

(21) Appl. No.: 15/503,950

(22) PCT Filed: Aug. 27, 2015

(86) PCT No.: PCT/US2015/047181
§ 371 (c)(1),
(2) Date: Feb. 14, 2017

(87) PCT Pub. No.: WO2016/036576
PCT Pub. Date: Mar. 10, 2016

(65) Prior Publication Data
US 2017/0275006 A1 Sep. 28, 2017

Related U.S. Application Data

(60) Provisional application No. 62/046,489, filed on Sep. 5, 2014.

(51) Int. Cl.
*B64D 15/12* (2006.01)
*H05B 3/34* (2006.01)
(Continued)

(52) U.S. Cl.
CPC .............. *B64D 15/12* (2013.01); *B64C 27/32* (2013.01); *H05B 3/20* (2013.01); *H05B 3/347* (2013.01);
(Continued)

(58) Field of Classification Search
CPC ........ B64D 15/00; B64D 15/12; B64D 15/14; H05B 3/34; H05B 3/36; B64C 27/32; B64C 27/46
See application file for complete search history.

(56) References Cited

U.S. PATENT DOCUMENTS 2,967,415 A * 1/1961 Ford ...................... B64D 15/12
219/212
3,496,331 A 2/1970 Fleury et al.
(Continued)

OTHER PUBLICATIONS

International Search Report for International Appl. No. PCT/US2015/047181; Interntional Filing Date: Aug. 27, 2015; dated Jan. 4, 2016; 6 pages.
(Continued)

*Primary Examiner* — Richard G Davis
(74) *Attorney, Agent, or Firm* — Cantor Colburn LLP

(57) ABSTRACT

A heater mat assembly for a rotor blade spar is provided including a plurality of electrically conductive heater wires extending in a spaced parallel configuration along a path of the rotor blade spar. An electrical current is flowed through the plurality of heater wires to inhibit ice accumulation on a portion of the rotor blade spar. At least one layer of a first insulating material is arranged adjacent a first side of each of the plurality of heater wires such that the at least one layer of the first insulating material is disposed between the plurality of heater wires and an adjacent surface of the rotor blade spar. The first insulating material comprises a thermally and electrically insulating material.

12 Claims, 7 Drawing Sheets

(51) Int. Cl.
*B64C 27/32* (2006.01)
*H05B 3/20* (2006.01)

(52) U.S. Cl.
CPC .. *H05B 2203/011* (2013.01); *H05B 2203/014* (2013.01); *H05B 2203/015* (2013.01); *H05B 2214/02* (2013.01)

(56) References Cited

U.S. PATENT DOCUMENTS

| | | | |
|---|---|---|---|
| 4,021,008 A | | 5/1977 | Eichenauer |
| 6,031,214 A | * | 2/2000 | Bost ................ B64D 15/12 219/202 |
| 6,145,787 A | | 11/2000 | Rolls |
| 7,157,663 B1 | | 1/2007 | Kismarton |
| 7,246,773 B2 | | 7/2007 | Stoner et al. |
| 2007/0092371 A1 | * | 4/2007 | Oldroyd ................. B32B 5/024 415/177 |
| 2008/0179448 A1 | | 7/2008 | Layland et al. |
| 2012/0125913 A1 | * | 5/2012 | Song ........................ H05B 3/34 219/546 |
| 2013/0032268 A1 | * | 2/2013 | Cinget ................ B60C 15/0632 152/542 |

OTHER PUBLICATIONS

Written Opinion of the International Searching Authority for International Appln. No. PCT/US205/047181; International Filing Date: Aug. 27, 2015; dated Jan. 4, 2016; 5 pages.

PCT International Preliminary Report on Patentability; International Application No. PCT/US2015/047181; International Filing Date: Aug. 27, 2015; dated Mar. 7, 2017, pp. 1-6.

\* cited by examiner

BLADE HEATER MAT INSULATION

CROSS REFERENCE TO RELATED APPLICATIONS

This application is a National Stage application of PCT/US2015/047181, filed Aug. 27, 2015, which claims the benefit of U.S. Provisional Application No. 62/046,489, filed Sep. 5, 2014, both of which are incorporated by reference in their entirety herein.

BACKGROUND OF THE INVENTION

The subject matter disclosed herein generally relates to an aircraft deicing system, and more particularly, to a deicing system for a rotor blade of a rotary wing aircraft.

Rotary wing aircrafts may encounter atmospheric conditions that cause the formation of ice on rotor blades and other surfaces of the aircraft. Accumulated ice, if not removed can add weight to the aircraft and may alter the airfoil configuration, causing undesirable flying characteristics.

A common approach to ice management is thermal deicing. Thermal deicing includes heating portions of the rotor blades, such as the leading edge for example, to loosen accumulated ice. Centrifugal forces acting on the rotor blades, and the airstream passing there over, remove the loosened ice from the rotor blades. Desired portions of the rotor blades are typically heated using electro thermal heating elements arranged at the leading edges of the airfoils, in direct contact with the blade spar. As a result of this direct contact, a malfunction of the electro thermal heating elements, such as by overheating or shorting for example, may damage the spar thereby affecting the structural stability and/or the airfoil of the rotor blade.

BRIEF DESCRIPTION OF THE INVENTION

According to one embodiment of the invention, a heater mat assembly for a rotor blade spar is provided including a plurality of electrically conductive heater wires extending in a spaced parallel configuration along a path of the rotor blade spar. An electrical current is flowed through the plurality of heater wires to inhibit ice accumulation on a portion of the rotor blade spar. At least one layer of a first insulating material is arranged adjacent a first side of each of the plurality of heater wires such that the at least one layer of the first insulating material is disposed between the plurality of heater wires and an adjacent surface of the rotor blade spar. The first insulating material comprises a thermally and electrically insulating material.

In addition to one or more of the features described above, or as an alternative, in further embodiments each of the heater wires includes a plurality of heater wires grouped to form a heater wire bundle. A first thread is looped around at least one of the plurality of heater wire bundles.

In addition to one or more of the features described above, or as an alternative, in further embodiments at least one layer of a second insulating material is arranged adjacent a second side of each of the plurality of heater wires. The second side is opposite the first side. The second insulating material comprises a thermally insulating material. A plurality of stitches connect the at least one layer of first insulating material and the at least one layer of second insulating material. The plurality of stitches extends parallel to and between adjacent heater wires.

In addition to one or more of the features described above, or as an alternative, in further embodiments the plurality of stitches define a pocket for each heater wire. The pock is configured to limit movement of the heater wires relative to one another.

In addition to one or more of the features described above, or as an alternative, in further embodiments a woven heater mat extends between the plurality of heater wires. The heater mat includes at least one warp thread disposed between adjacent heater wires and knitted to adjacent pairs of first threads without looping around the plurality of heater wires. The warp thread is configured to maintain a spacing between adjacent heater wires.

In addition to one or more of the features described above, or as an alternative, in further embodiments the at least one layer of the first insulating material is integrally formed with the woven heater mat.

In addition to one or more of the features described above, or as an alternative, in further embodiments the at least one layer of the first insulating material includes at least one insulating thread woven with the first thread and the warp thread. The insulating thread is looped around the first side of the plurality of heater wires.

In addition to one or more of the features described above, or as an alternative, in further embodiments the at least one layer of the first insulating material is attached to a first surface of the woven heater mat.

In addition to one or more of the features described above, or as an alternative, in further embodiments the at least one layer of the first insulating material is positioned adjacent, but not connected to, a first surface of the woven heater mat.

According to another embodiment of the invention, a rotor blade assembly is provided including a rotor blade having a rotor blade spar and a heater mat assembly secured to the rotor blade. The heater mat assembly includes a plurality of electrically conductive heater wires extending in a spaced parallel configuration along a path of the rotor blade spar. An electrical current is flowed through the plurality of heater wires to inhibit ice accumulation on a portion of the rotor blade spar. At least one layer of a first insulating material is arranged adjacent a first side of each of the plurality of heater wires such that the at least one layer of the first insulating material is disposed between the plurality of heater wires and an adjacent surface of the rotor blade spar. The first insulating material comprises a thermally and electrically insulating material.

In addition to one or more of the features described above, or as an alternative, in further embodiments at least one layer of a second insulating material is arranged adjacent a second side of each of the plurality of heater wires. The second side is opposite the first side. The second insulating material comprises a thermally insulating material. A plurality of stitches connect the at least one layer of first insulating material and the at least one layer of second insulating material. The plurality of stitches extends parallel to and between adjacent heater wires.

In addition to one or more of the features described above, or as an alternative, in further embodiments a woven heater mat extends between the plurality of heater wires. The heater mat includes at least one first thread knitted to the plurality of heater wires. Each first thread looping around one of the plurality of heater wires. The heater mat also includes at least one warp thread disposed between adjacent heater wires and knitted to adjacent pairs of first threads without looping around the plurality of heater wires. The warp thread is configured to maintain a spacing between adjacent heater wires.

In addition to one or more of the features described above, or as an alternative, in further embodiments the at least one layer of the first insulating material is integrally formed with the woven heater mat.

In addition to one or more of the features described above, or as an alternative, in further embodiments the at least one layer of the first insulating material is attached to a first surface of the woven heater mat.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
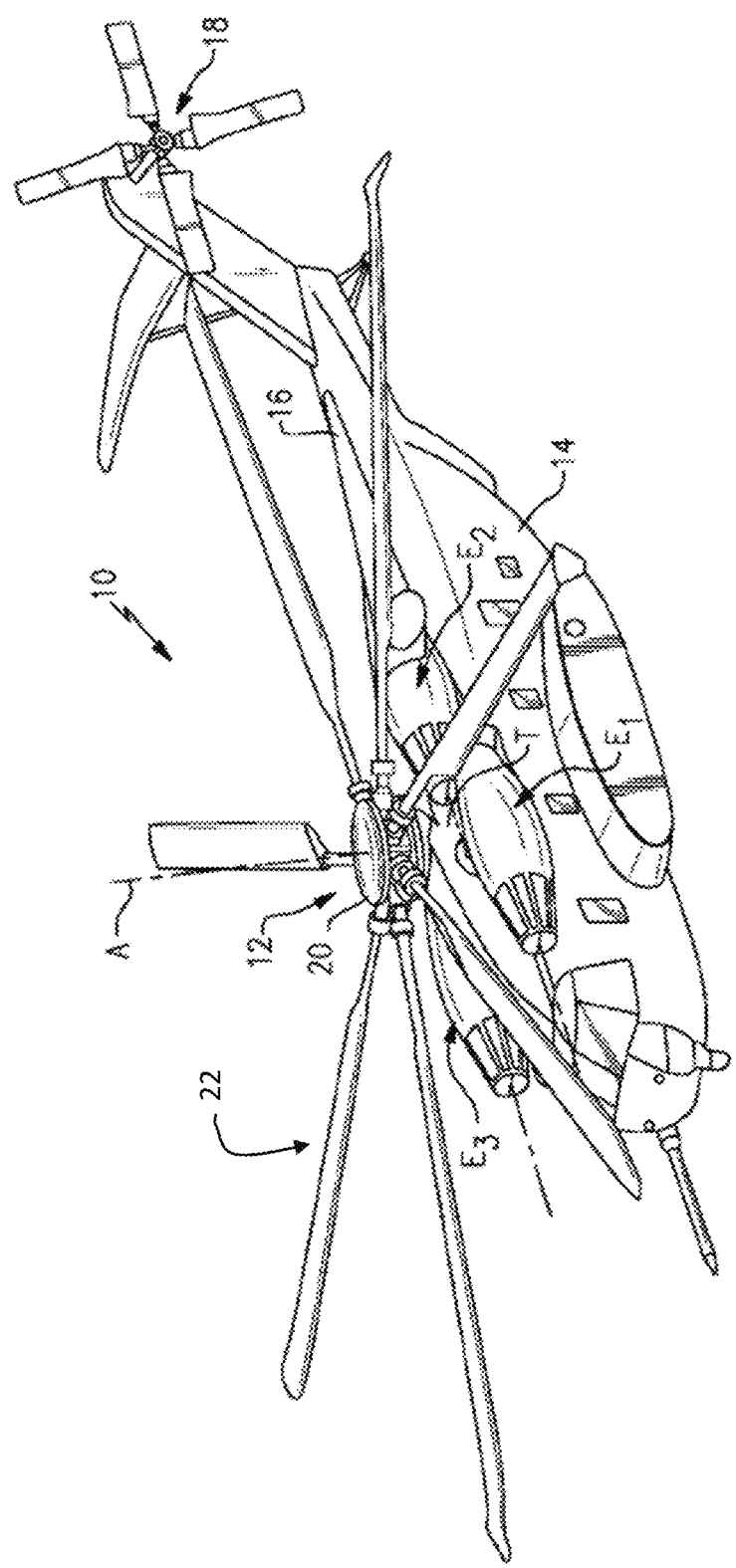
FIG. 1 is a perspective view of an embodiment of an aircraft.

FIG. 1 schematically illustrates an example of a rotary wing aircraft 10 having a main rotor assembly 12. The aircraft 10 includes an airframe 14 having an extending tail 16 which mounts a tail rotor system 18, such as an anti-torque system, a translational thrust system, a pusher propeller, a rotor propulsion system, and the like. The main rotor assembly 12 includes a plurality of rotor blade assemblies 22 mounted to a rotor hub 20. The main rotor assembly 12 is driven about an axis of rotation A through a main gearbox (illustrated schematically at T) by one or more engines E. Although a particular helicopter configuration is illustrated and described in the disclosed embodiment, other configurations and/or machines, such as high speed compound rotary wing aircrafts with supplemental translational thrust systems, dual contra-rotating, coaxial rotor system aircrafts, tilt-rotors and tilt-wing aircrafts, and fixed wing aircrafts, will also benefit from embodiments of the invention.

Figure 2:
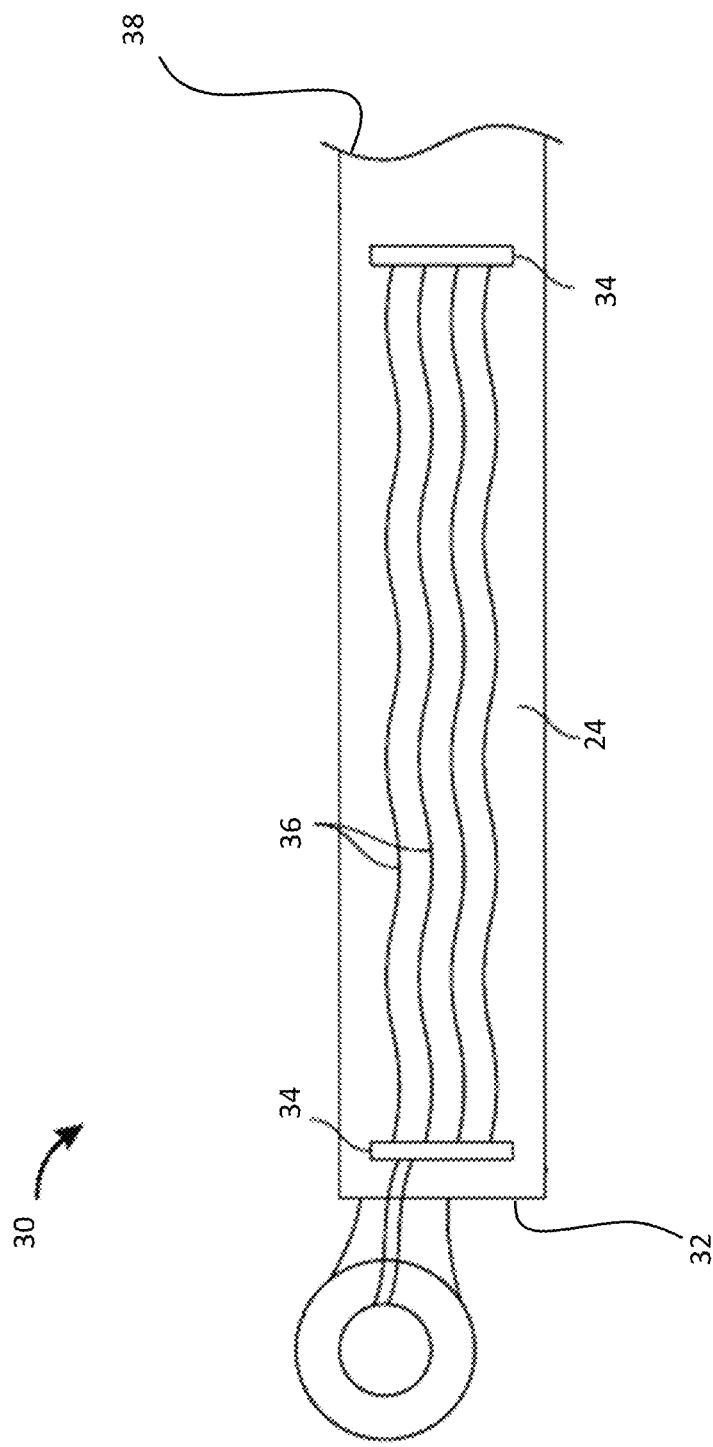
FIG. 2 is a plan view of an embodiment of a rotor blade assembly including a heater mat assembly according to an embodiment of the invention.

One or more of the blade assemblies 22 of the rotary wing aircraft 10 includes a heater mat assembly 30 as illustrated in FIG. 2. The heater mat assembly 30 includes a plurality of conductive heater wires 36 extending from a bus bar 34 arranged adjacent a first end 32 of the heater mat assembly 30. The bus bar 34 is a termination point of the heater mat assembly 30, and the plurality of heater wires 36 are electrically connected thereto. The heater wires 36 may extend from the bus bar 34 in a substantially curvilinear path, such as a sinusoidal path for example, which is configured to relieve stress as the assembly 22 spins. In the illustrated, non-limiting embodiment, the plurality of heater wires 36 extend substantially parallel to each other, although other patterns are within the scope of the invention so long as the heater wires 36 do not overlap one another. In some embodiments, a second bus bar 34 is arranged at a second, opposite end 38 of the heater mat assembly 30 such that the heater wires 36 extend between and connect the first and second bus bars 34. However, it is understood that other mechanisms can be used to complete the circuit at the terminal end 38 of the heater mat assembly 30.

Figure 3:
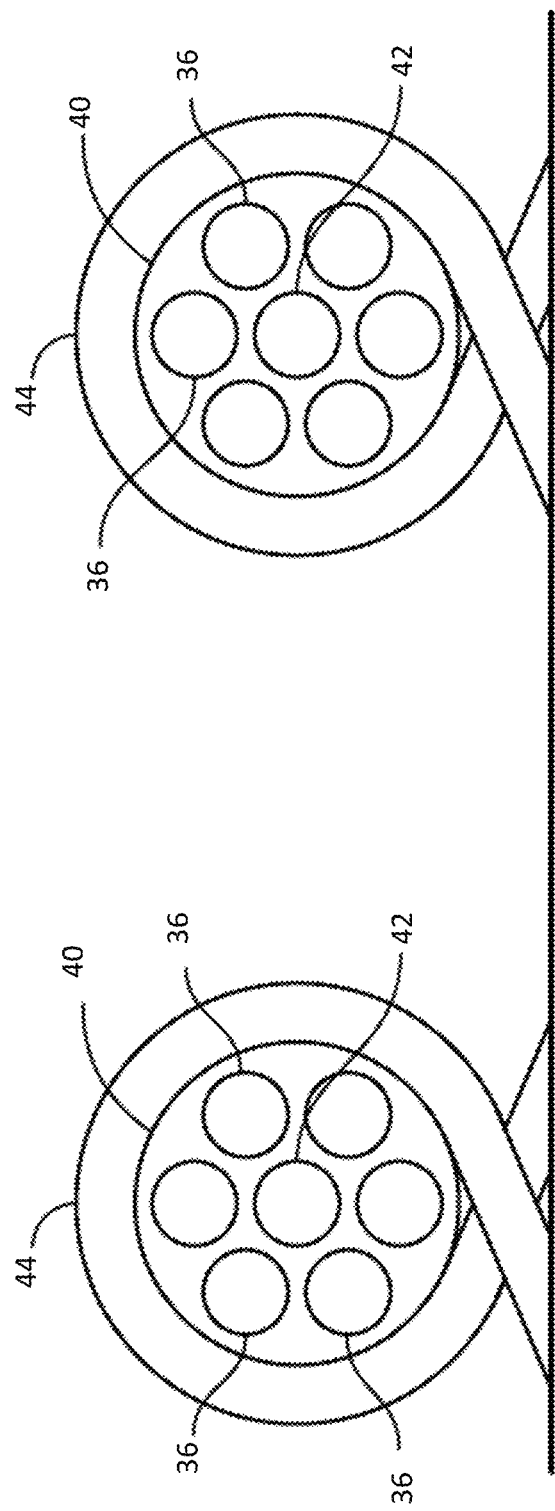
FIG. 3 is a cross-sectional view of an embodiment of a heater wire arrangement of a heater mat assembly according to an embodiment of the invention.

The heater wires 36 may, but need not be grouped into heater wire bundles 40, as shown in FIG. 3. The illustrated, non-limiting heater wire bundles 40 includes six individual heater wires 36 wound or braided into a heater wire bundle 40. In addition, the heater wire bundle 40 may include other members, such as a non-conductive bundle core 42 for example. A non-conductive covering (not shown) may also be used to surround and protect each of the wires within the bundle. As shown, a plurality of first threads 44 may be looped around the exterior of each wire bundle 40 to secure the bundle. In one embodiment, the first threads 44 are formed from nylon and glass fibers; however, any material may be used to prevent movement of the bundles 40 relative to one another.

Figure 4:
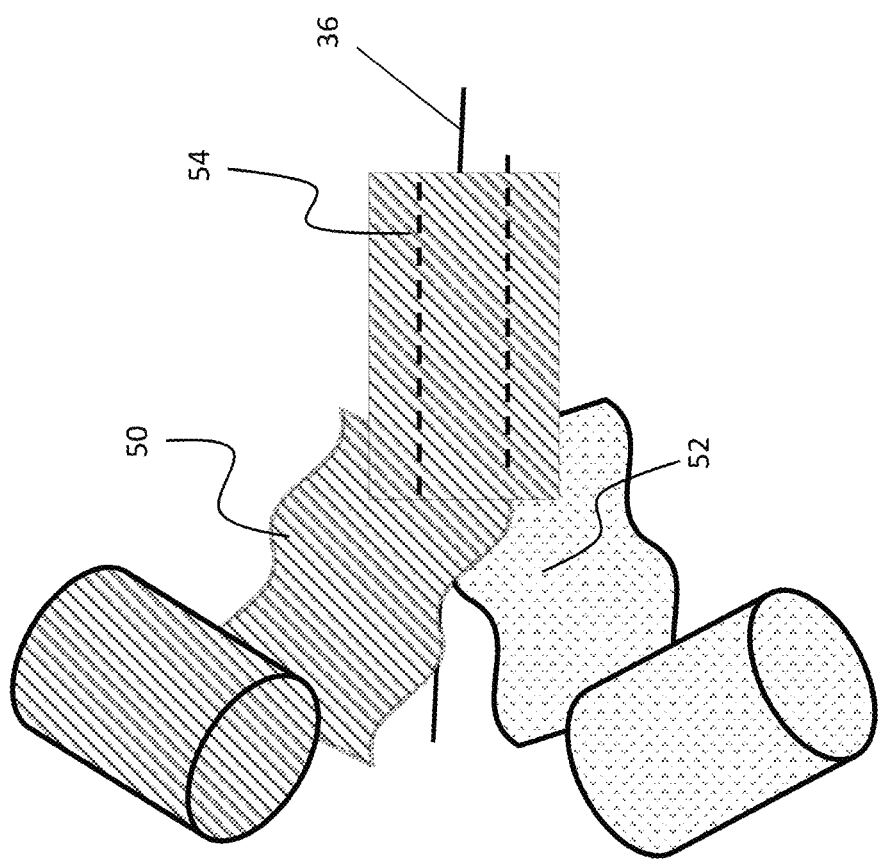
FIG. 4 is a perspective view of a stitched heater mat assembly according to an embodiment of the invention.
Figure 5:
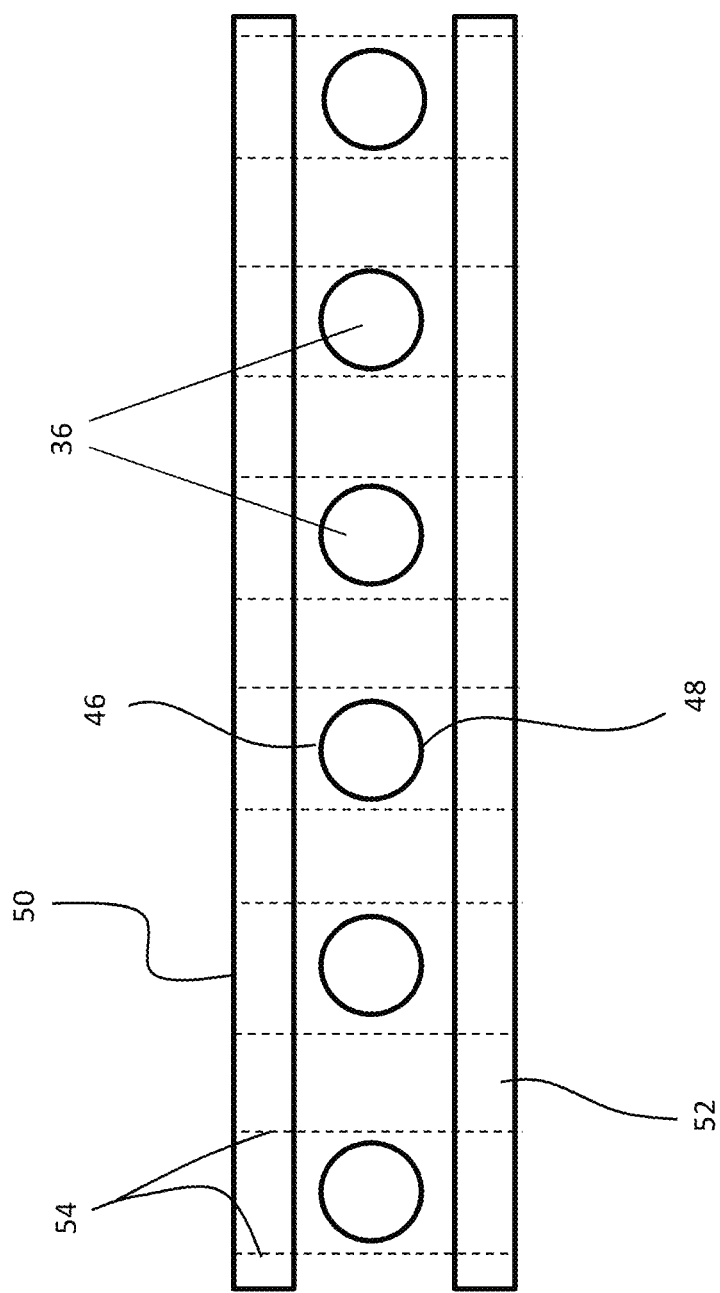
FIG. 5 is a cross-sectional view of the heater mat assembly of FIG. 4 according to an embodiment of the invention.

Heater mat assemblies 30 of various constructions are within the scope of the invention. Referring now to FIGS. 4 and 5, a heater mat assembly 30 having a stitched construction is illustrated. In the illustrated, non-limiting embodiment, the heater mat assembly 30 includes at least one layer of a first insulating material 50 arranged adjacent a first side 46 of a plurality of spaced, parallel heater wires 36 and at least one layer of a second insulating material 52 arranged adjacent a second, opposite side 48 of the plurality of spaced, parallel heater wires 36. Alternatively, the plurality of heater wires 36 may be substituted with heater wire bundles 40. The first insulating material 50 and the second insulating material 52 may, but need not be the same material. In one embodiment, the first insulating material 50 is a fiberglass fabric which provides thermal and electrical insulation, and the second insulating material 52 is a protective ceramic fabric, such as Nextel™ 312-AF10 for example, which provides thermal and electrical insulation and comprises a woven Alumina-Boria-Silica Fiber. The second insulating material 52 insulates the spar 24 against heat caused by the arcing at the wire bundles 40 or the wires 36, which can produce heat at between 900° F. to 250° F., as well as being a dielectric which provides electrical insulation. However other types of insulating material are within the scope of the invention.

In the illustrated, non-limiting embodiment, the first insulating material 50 and the second insulating material 52 are stitched together with a plurality of stitches 54 extending over a length of the heater mat assembly 30, parallel to and surrounding each of the plurality of heater wires 36 or wire bundles 40 therein. The stitches 54 define a pocket for each of the heater wires 36 to limit the wires 36 from moving or drifting into contact with one another. As a result, the stitches 54 arranged between adjacent wires 36 prevent the occurrence of an electrical short if the wires 36 or wire bundles 40 move too close together. One of the insulating materials, such as the second insulating material 52 for example, is configured to contact a surface 26 of the spar 24 of a rotor blade assembly (FIG. 7).

Figure 6:
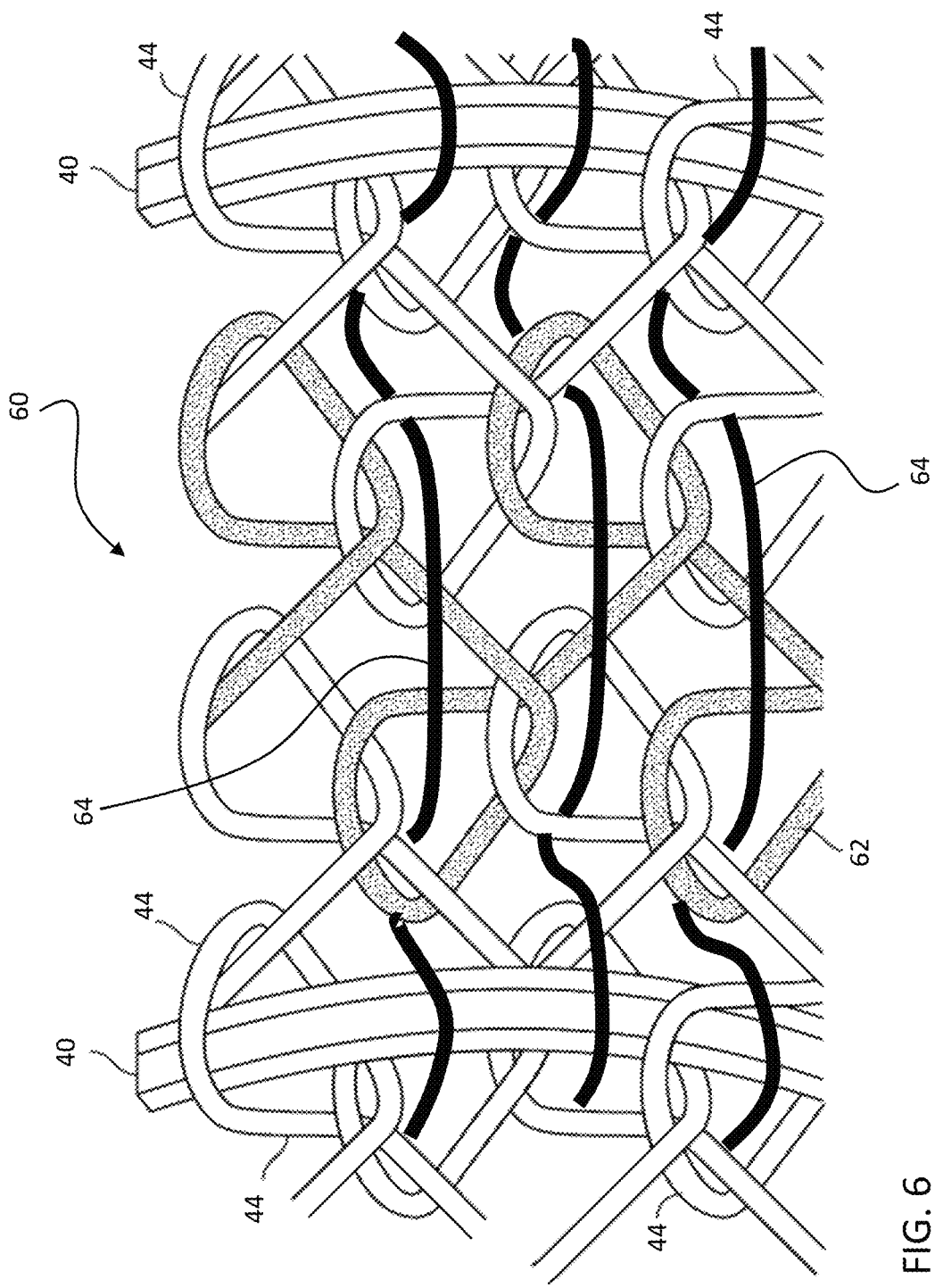
FIG. 6 is a detailed view of woven heater mat assembly according to an embodiment of the invention.
Figure 7:
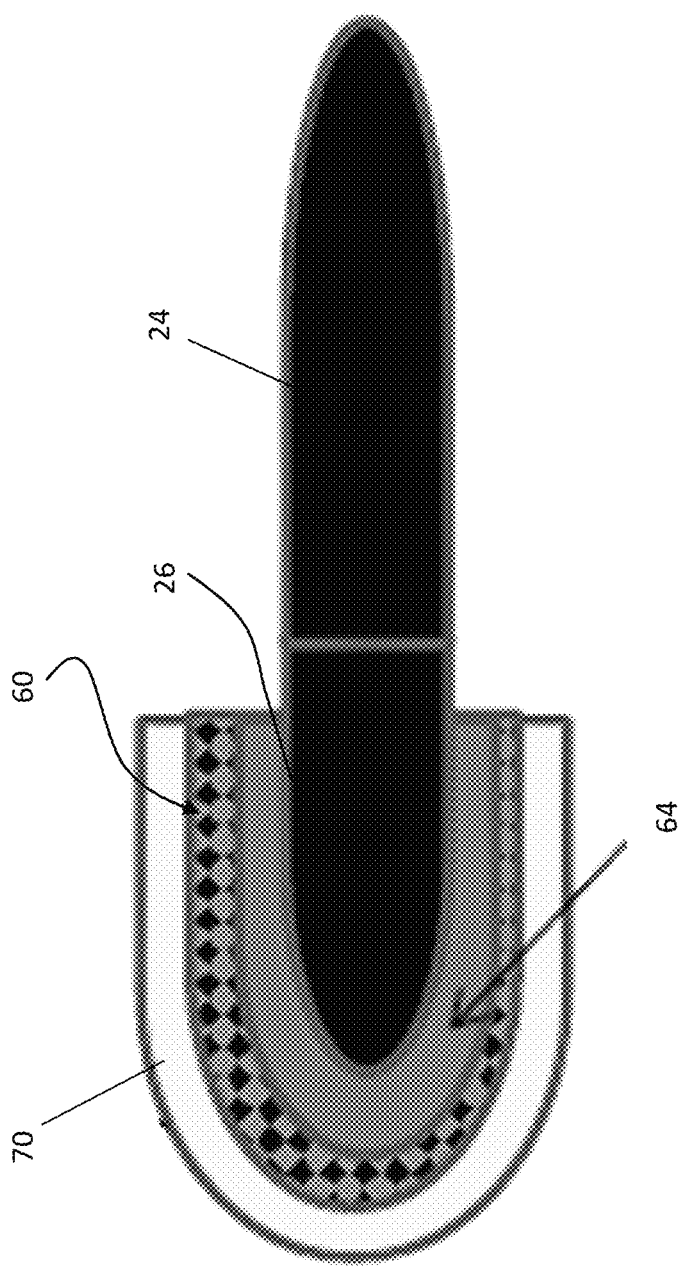
FIG. 7 is a cross-sectional view of a rotor blade assembly including a woven heater mat assembly.

In another embodiment, illustrated in FIGS. 6 and 7, the heater mat assembly 30 has a woven construction. In such embodiments, a heater mat 60 is formed from one or more warp threads 62 located between parallel wire bundles 40. The warp threads 62 are knitted into the first threads 44 without crossing over or looping around the wire bundles 40. The warp threads 62 may, but need not be, formed from the same material as the first thread 44. The warp threads 62 are configured to retain adjacent first threads 62 and thus maintain a desired spacing between the wire bundles 40 during rotation of the main rotor system 12. This spacing similarly prevents the occurrence of an electrical short and also prevents excessive strain and fatigue failure of the heater wires 36 or wire bundles 40. However, other types of weaving can be used.

In embodiments where the heater mat assembly 30 includes a generally woven construction, the heater mat assembly 30 may further include one or more layers of insulating material, such as Nextel™ 312-AF10 for example, which provide thermal protection. The layer of insulating material may be integrally formed with the heater mat 32, such as by weaving a plurality of insulating threads 64 with the first threads 44 surrounding the heater wires 36 or wire bundles 40 and with the warp threads 62 extending between adjacent first threads 44. In one embodiment, the plurality of insulating threads 64 cross-over and/or loop around the plurality of heater wires 36 or wire bundles 40 to form a layer of insulating material arranged between the heater wires 36 and an adjacent surface, such as a surface 26 of a rotor blade spar 24 for example.

Alternatively, the layer of insulating material 64 may be a separate piece of cloth or fabric that is bonded, such as with an adhesive for example, to the surface of the woven heater mat 32 configured to contact the spar of a rotor blade assembly 22 (FIG. 7). In other embodiments, the at least one layer of insulating material 64 may be positioned adjacent, but not connected to, the surface of the woven heater mat 60 configured to contact the rotor blade spar 24. For example, the one or more layers of insulating material 64 may be positioned about a portion of the rotor blade spar 24, such as the tip for example, prior to installation of the heater mat assembly 30 thereon.

Referring again to FIG. 2, the heater mat assembly 30 or at least a portion thereof may be mechanically secured to the rotor blade 22 via, for example, screws or other fasteners, and/or via adhesives. Further, in some embodiments, the heater mat assembly 30 may be embedded in, or formed integral to, components of the rotor blade 22, for example, outer skin 24 of the rotor blade 22, or a tip cap 70 positioned there over (FIG. 7).

The heater mat assembly 30 is configured to connect to an electrical power supply (not shown), in some embodiments located at the airframe 14 of the rotary wing aircraft 10. The connection may be achieved via a slip ring 70 at the rotor hub 20 with a plurality of leads 72 extending from the slip ring 70 to the heater mat assembly at, for example, the bus bar 34. When an electrical current is flowed through the heater wires 36 from the power supply (not shown), the flow generates heat to melt ice accumulation on the blade assembly 22 and/or prevent ice accumulation on the blade assembly 22.

By positioning one or more layers of insulating material 52, 64 between the heater wires 36 or heater wire bundles 40 of the heater mat assembly 36 and an adjacent surface of the spar 24, the spar 24 is protected from damage as a result of overheating or shorting of the heater mat assembly 30. In addition, a heater mat assembly 30 with a stitched configuration has a reduced complexity and therefore a reduced cost by eliminating the need for weaving specialists.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. By way of example, aspects can be used in wind turbines, propellers used on fixed wing aircraft, or surfaces where a heater mat is being used to prevent ice buildup. Accordingly, the invention is not to be seen as limited by the foregoing description, but is only limited by the scope of the appended claims.

What is claimed is:

1. A heater mat assembly for a rotor blade spar comprising:
    a plurality of electrically conductive heater wires including a first electrically conductive heater wire and a second electrically conductive heater wire extending in spaced, parallel configuration along a path of the rotor blade spar, wherein an electrical current is flowed through the plurality of heater wires to inhibit ice accumulation on a portion of the rotor blade spar; and
    at least one layer of a first insulating material arranged adjacent a first side of each of the plurality of heater wires such that the at least one layer of the first insulating material is disposed between the plurality of heater wires and an adjacent surface of the rotor blade spar, wherein the first insulating material comprises a thermally and electrically insulating material;
    a material associated with the plurality of electrically conductive heater wires to restrict movement of the first electrically conductive heater wire and the second electrically conductive heater wire such that the first electrically conductive heater wire cannot contact the second electrically conductive heater wire; and
    a woven heater mat extending between the plurality of heater wires, the heater mat including the material, wherein the material includes at least one warp thread disposed between adjacent heater wires and knitted to adjacent pairs of first threads without looping around the plurality of heater wires.

2. The heater mat assembly according to claim 1, wherein each of the first electrically conductive heater wire and the second electrically conductive heater wire includes a plurality of heater wires grouped to form a heater wire bundle, a first thread being looped around at least one of the plurality of heater wire bundles.

3. The heater mat assembly according to claim 1, wherein the at least one layer of the first insulating material is integrally formed with the woven heater mat.

4. The heater mat assembly according to claim 3, wherein the at least one layer of the first insulating material includes at least one insulating thread woven with the first thread and the warp thread, the insulating thread being looped around the first side of the plurality of heater wires.

5. The heater mat assembly according to claim 1, wherein the at least one layer of the first insulating material is attached to a first surface of the woven heater mat.

6. The heater mat assembly according to claim 1, wherein the at least one layer of the first insulating material is positioned adjacent, but not connected to, a first surface of the woven heater mat.

7. The heater mat assembly of claim 1, wherein the plurality of electrically conductive heater wires are electrically isolated from one another.

8. A rotor blade assembly comprising:
a rotor blade including a rotor blade spar; and
a heater mat assembly secured to the rotor blade, the heater mat assembly including:
a plurality of electrically conductive heater wires extending in spaced, parallel configuration along a path of the rotor blade spar, wherein an electrical current is flowed through the plurality of heater wires to inhibit ice accumulation on a portion of the rotor blade spar;
at least one layer of a first insulating material arranged adjacent a first side of each of the plurality of heater wires such that the at least one layer of the first insulating material is disposed between the plurality of heater wires and an adjacent surface of the rotor blade spar, wherein the first insulating material comprises a thermally and electrically insulating material;
a material associated with the plurality of electrically conductive heater wires to restrict movement of the plurality of electrically conductive heater wires such that the plurality of electrically conductive heater wires cannot contact one another
a woven heater mat extending between the plurality of heater wires, the heater mat including:
at least one first thread knitted to the plurality of heater wires, each first thread looping around at least one of the plurality of heater wires;
the material, the material including at least one warp thread disposed between adjacent heater wires and knitted to adjacent pairs of first threads without looping around the plurality of heater wires.

9. The rotor blade assembly according to claim 8, wherein the at least one layer of the first insulating material is integrally formed with the woven heater mat.

10. The rotor blade assembly according to claim 8, wherein the at least one layer of the first insulating material is attached to a first surface of the woven heater mat.

11. The rotor blade assembly according to claim 8, wherein the at least one layer of the first insulating material is positioned adjacent, but not connected to, a first surface of the woven heater mat.

12. The rotor blade assembly according to claim 8, wherein the plurality of electrically conductive heater wire are electrically isolated from one another.

* * * * *